(12) United States Patent
Clermidy et al.

(10) Patent No.: US 7,957,381 B2
(45) Date of Patent: Jun. 7, 2011

(54) GLOBALLY ASYNCHRONOUS COMMUNICATION ARCHITECTURE FOR SYSTEM ON CHIP

(75) Inventors: Fabien Clermidy, Saint-Égrève (FR);
Pascal Vivet, Saint-Paul-de-Varces (FR);
Edith Beigne, Méaudre (FR)

(73) Assignee: Commissariat a l'Energie Atomique, Paris (FR)

( * ) Notice: Subject to any disclaimer, the term of this patent is extended or adjusted under 35 U.S.C. 154(b) by 652 days.

(21) Appl. No.: 11/372,252

(22) Filed: Mar. 8, 2006

(65) Prior Publication Data

US 2006/0209846 A1    Sep. 21, 2006

(30) Foreign Application Priority Data

Mar. 8, 2005 (FR) ...................... 05 50610

(51) Int. Cl.
*H04L 12/28* (2006.01)
(52) U.S. Cl. .................. 370/392; 370/389; 370/351
(58) Field of Classification Search .................. 370/392, 370/389, 351
See application file for complete search history.

(56) References Cited

U.S. PATENT DOCUMENTS

| | | | | |
|---|---|---|---|---|
| 6,034,956 A | * | 3/2000 | Olnowich et al. | 370/388 |
| 2003/0035371 A1 | * | 2/2003 | Reed et al. | 370/230 |

FOREIGN PATENT DOCUMENTS

WO     WO 03/065236 A1    8/2003

OTHER PUBLICATIONS

Bolotin et al, QNoC: QoS archtiteture and design process for network on chip, 2003.*
Kumar et al, A Network on Chip Architecture and Design Methodology, 2002.*
Abrial, A. et al., "A New Contactless Smartcard IC Using an On-Chip Antenna and An Asynchronous Micro-Controller," Proceedings of 26$^{th}$ European Solid State Circuits Conference, ESSCIRC'00, 2000, 4 pages.
Bainbridge, John et al., "Chain: A Delay-Insensitive Chip Area Interconnect," 2002 IEEE, pp. 16-23.
Banerjee, Nilanjan et al., "A Power and Performance Model for Network-on-Chip Architectures," Proceedings of the Design, Automation and Test in Europe Conference and Exhibition, 2004, 4 pages.
Bolotin, Evgeny et al., "Cost Considerations in Network on Chip," Integration, the VLSI Journal 38, 2004, pp. 19-42.

(Continued)

*Primary Examiner* — Pankaj Kumar
*Assistant Examiner* — Gautam Sharma
(74) *Attorney, Agent, or Firm* — Nixon Peabody LLP

(57) ABSTRACT

This invention relates to the domain of Networks on Chips (NoC) and relates to a method of transferring data in a network on chip, particularly using an asynchronous "send/accept" type protocol.
The invention also relates to a network on chip used to implement this method.

32 Claims, 7 Drawing Sheets

OTHER PUBLICATIONS

Duc, Anh Vu Dinh et al., Synthesis of QDI Asynchronous Circuits From DTL-Style Petri-Net, IWLS-02, 11$^{th}$ IEEE/ACM International Workshop on Logic & Synthesis, New Orleans, Louisiana, Jun. 4-7, 2002, pp. 191-196.

Duc, Anh Vu Dinh, "TAST CAD Tools", Tima Laboratory, CIS group: http://www.tima.imag.fr/cis, ISRN: TIMA-RR-Feb. 7, 2001-FR, Async '02, pp. 1 of 46.

Felicijan, Tomaz, An Asynchronous Low Latency Arbiter for Quality of Service (QoS) Applications, ICM 2003, pp. 123-126.

Felicijan, Tomaz, "An Asynchronous On-Chip Network Router with Quality-of-Service (QoS) Support," IEEE 2004, pp. 274-277.

Felicijan, Tomaz, "Quality of Service (QoS) for Asynchronous On-Chip Networks," University of Manchester, Dept. of Computer Science, Sep. 2003, 4 pages.

Glass, Christopher J., "The Turn Model for Adaptive Routing," Dept. Of Computer Science, Michigan State ACM, 1992, pp. 278-287.

Martin, Alain J., "Synthesis of Asynchronous VLSI Circuits," California Institute of Technology, Computer Science Department, Caltec-CS-TR-93-28, 1991, 147 pages.

Moore, Simon et al., "Point to Point GALS Interconnect," Proceedings of the Eighth International Symposium on Asynchronous Circuits and Systems, 2002, 4 pages.

Renaudin, M., "ASPRO-216: A Standard-Cell Q.D.I. 16-Bit RISC Asynchronous Microprocessor," Proc. of the Fourth Intl. Symposium on Advanced Research in Asynchronous Circuits and Systems, 1998, IEEE, pp. 22-31.

Rigaud, J-B., et al., "Modeling and Design of Asynchronous Priority Arbiters for On-Chip Communication Systems," 12 pages.

Rigaud, Jean-Baptist, Specification De Bibliotheques Pour La Synthese De Circuits Asynchrones, Dec. 23m 2002, 203 pages.

Rijpkema, E., et al., "Trade-Offs in the Design of a Router With Both Guaranteed and Best-Effort Services for Networks on Chip," IEE Proc.-Comput. Digit. Tech., vol. 150, No. 5, Sep. 2003, pp. 294-302.

Vivet, Pascal, Marc, "Une Methodologie De Conception De Circuits Integres Quasi-Insensibles Aux Delais: Application A L'Etude Et A La Realisation D'Un Processeur RISC 16-Bit Asynchrone," Jun. 21, 2001, 257 pages.

* cited by examiner

GLOBALLY ASYNCHRONOUS COMMUNICATION ARCHITECTURE FOR SYSTEM ON CHIP

CROSS-REFERENCE TO RELATED APPLICATION

This application claims priority to French Application No. 05 50610, filed on Mar. 8, 2005, entitled: "Globally Asynchronous Communication Architecture for System on Chip" by Fabien Clermidy, Pascal Vivet and Edith Beigne and was not published in English.

TECHNICAL DOMAIN AND PRIOR ART

This invention relates to the domain of Networks on Chips (NoC). It relates to a method of transferring data in a network on chip, particularly using an asynchronous "send/accept" type protocol and an improved network on chip structure, so that such transfers can be implemented.

This structure can be made to operate globally asynchronously, even if it comprises units or blocks implemented in synchronous logic. This structure does not necessarily require a specialized logic, and it may comprise elements and particularly nodes implemented in synchronous logic, and other elements and particularly other nodes implemented in asynchronous logic. This structure is capable of performing different types of services, for example such as a "guaranteed latency" service and another service commonly called the "best effort" service. Implementation of these different services and management of priorities between data packets transiting in such a structure is at least partly assured by means for priority channels called "virtual channels", with which data packets are associated.

At the present time, the main method used to make different modules of an ASIC (Application Specific Integrated Circuit) or a chip communicate with each other is to use a bus topology. With this type of topology, the modules of a chip that need to communicate with each other are connected to the same communication medium that they use in turn, for example to send data. A central element called the "bus arbitrator" provides an access right to the medium for the different modules so as to avoid bus reservation conflicts.

In particular, this system has the disadvantage of having low communication throughputs that could result in a high latency, and it is increasingly difficult to make particularly in terms of clock trees, particularly due to capacitive charge problems. It is also difficult to precisely adapt the throughput carried by a communication bus from a chip to the application implemented by all modules on the chip. Furthermore, such a system is usually very specific to a given application and generally cannot be reused in another application, once it has been designed for one application.

Network on chips (NoC) were developed in order to improve the problems mentioned above.

For example a network on chip was proposed by Goossens et al. in "Trade offs in the design of a router both guaranteed and best-efforts service for networks on chip", Proceedings of DATE conference, 2003, p 350-355. In particular, this document describes a network on chip architecture provided with a communication medium with a matrix or mesh type topology. This communication medium comprises routing nodes that can be used to make two different routing types. A first routing type is used to provide a first type of service called a "guaranteed latency" time, in which the time spent by data to pass from a first resource to a second resource is approximately constant. A second type of routing is used to provide a second type of service, commonly called the "best effort", for which use of the capacity of network links connecting routing nodes is maximum. In this architecture, access to the communication medium is governed by a global network clock using time multiplexing. The use of such an architecture can be complex, particularly concerning placement-routing of its elements, and the production of its clock tree. It is also difficult to control the consumption of such a network, particularly to control consumption due to the clock tree. It is also difficult to control the consumption of such a network, particularly to control consumption due to the clock tree.

One network on chip in which routing nodes communicate asynchronously with each other was proposed by Brainbridge and S. Furber in <<Delay Insensitive System on Chip Interconnect>> Using 1 of 4 Data Encoding>>, Proceedings of International Symposium on Advanced Research in Asynchronous Circuits and Systems, March 2001, pages 118 to 126. Data transiting in such a network are also encoded using an encoding type commonly called <<one hot encoding>>. However, this network has the particular disadvantage that it uses a specific logic, which makes it difficult to produce. Furthermore, such a network does not use different service types, for example a <<guaranteed>> latency service and a service commonly called <<best effort>>.

The documents: <<Quality of Service (QoS) for Asynchronous On-Chip Networks>>, T. Felicijan, S. B. Furber, Formal Methods for Globally Asynchronous Locally Synchronous Architecture (FMGALS 2003) Pisa, Italy, September 2003, and <<An Asynchronous On-Chip Network Router with Quality-of-Service (QoS), T. Felicijan, S. B. Furber Support Proceedings IEEE International SOC Conference, Santa Clara, Calif. September 2004, pp 274-277, ISBN: 0-7803-8445-8, disclose methods of managing the quality of service in an asynchronous network on chip provided with elements, and particularly routing nodes implemented in asynchronous logic, using virtual channels.

The problem arises of finding a new method of transferring data in a globally asynchronous network on chip that may comprise elements implemented in synchronous logic and/or elements implemented in asynchronous logic, and a new network on chip structure operating globally asynchronously that does not use a global clock to manage data transfers within it, that can comprise elements implemented in synchronous logic and/or elements implemented in asynchronous logic, and that is capable of implementing different types of services, for example depending on whether it is required to give priority to a fast data transfer between some resources or some data, or whether it is required to obtain a guaranteed throughput between some resources or for some data.

PRESENTATION OF THE INVENTION

The invention uses an improved network on chip structure, and an improved method for transferring or transmitting data in such a network.

The invention relates firstly to a method of transmitting data in a network on chip formed from a plurality of elements capable of communicating with each other, the plurality of elements comprising a plurality of resources capable of processing data, and a plurality of nodes capable of connecting resources to each other and switching data in the network, each node being provided with a plurality of inputs and a plurality of outputs, the method comprising:

at least one transfer step, transferring at least one data packet comprising one or several elementary groups of data called "flits", from a sending element in the network to a receiving element in the network, using an asynchronous communication protocol, the transfer of one or several elementary data groups or all of the elementary data groups in said packet, being accompanied by or associated with a sending, by the first element of at least one signal of a first type according to said protocol, the transfer also being authorized by the receiving element, by this receiving element sending at least one second type of signal according to said protocol, in response to the signal of the first type.

Data packets transiting in the network may each be associated with priority level or priority channel information chosen among a set of different priority channels.

According to one possible embodiment of the method in which said data packet is associated with priority level or priority channel information, said first type of signal according to said asynchronous communication protocol may at least partly comprise the priority level or priority channel information with which this packet is associated.

According to one variant embodiment of the method, the first type of signal accompanying sending an elementary group of data and said elementary data group may be sent simultaneously.

The protocol used to enable such transfers may be a high level protocol implemented in synchronous and/or asynchronous logic. This protocol can thus be used to set up data transfers between at least two network blocks, each of which is synchronous but operating with a phase shift, for example between at least. one first node in the network associated with a first clock, and at least one second node associated with a second clock, different from or with a phase shift from the first clock.

This protocol can also be used to set up data transfers between at least two network blocks, each of which is asynchronous, for example between at least one first node in the network without a clock, and at least one second node without a clock.

This protocol can also be used to set up data transfers between at least two blocks in the network, one being synchronous and the other asynchronous, for example between at least one first node in the network associated with a first clock, and at least one other asynchronous node or a node without a clock.

This protocol may be designed such that a given flit or an elementary group of data in a data packet can be sent by the sending element as soon as another flit preceding this given flit in said packet has been accepted by the receiving element.

According to one possible embodiment of the data transfer method according to the invention, this method may also comprise:

at least one arbitration of a transfer order output from the first node between at least one first data packet and at least one second data packet, by at least one first element of the network, for example a first node in the network, the transfer order being determined at least partially as a function of one or several priority channels with which the first packet and the second packet were associated by a network resource.

A resource may have associated the first packet with a first priority channel chosen from among a set of predetermined channels. The same resource or a different resource may have associated the second packet with a second priority channel chosen from among a set of predetermined channels, with a priority level different from that of the first channel.

Association of a data packet with a priority channel may at least partly depend on the data type contained within this packet.

For example, packets originating from different resources and comprising data of a first type, for example interrupt data, may be associated with a same first priority channel, while other data packets originating from different resources and comprising data of a second type, for example calculation or programming data, may be associated with a second priority channel with a priority level different from the priority level of the first channel.

When a resource associates a data packet with a priority channel, this packet can be linked to a service type.

Thus, the different priority channels or the different virtual channels in said set of predetermined channels, may also be used to implement different types of data transfer services, for example such as at least one service commonly called the "best effort" service, and at least one other service commonly called the "guaranteed latency" service. These different services may be implemented with a single routing system.

During the arbitration step, the transfer order between the first packet and the second packet may be determined only as function of the corresponding priority levels of the first channel and the second channel. For example, this can be the case when the first packet and the second packet are associated with different channels. The transfer order between the first packet and the second packet can then possibly be determined independently of the order of their arrival at the first node or the source of each.

According to a first variant of the data transmission method, for which the first data packet and the second data packet were associated with a first channel and a second channel respectively with a priority level lower than the priority level of the first channel, a first group of data in the first packet and another group of data in the second packet having accessed the first node and getting ready to access an output or the same output in the first node, this method may also include the following after the arbitration step:

transfer of the first data packet at the output from the first node, transfer of the second data packet at the output from the first node, after the entire first packet has been transferred at the output from the first node.

According to one possible embodiment, the method may also include the following steps after the arbitration step and before the step to transfer the entire second packet:

the second packet is at least partially stopped at the first node.

If the transfer of the second packet at the output from the first node has already begun before the arbitration step, and at least a second data group in the second packet has already been transferred at the output from the first node and/or has already left the first node, while no data from the first data packet has yet been transferred to the output of the first node and/or has already been output from the first node, the method may also include the following steps:

stop said other data group in the second packet, displace or transfer said second data group in the second packet, into the network.

Thus, according to one possible embodiment, data in the second packet that have previously been output from the first node can be moved, even if the transfer of this second packet at the output from the first node has been temporarily stopped.

If at least a third data group of the second packet has not yet accessed the first node before the arbitration step, the method may also include the following steps, after the arbitration step and possibly during a partial stop of the second data packet:

transfer of at least part of the data in the third group of data in the second packet, to the input of the first node.

Thus, according to one possible embodiment, the data in the second packet that have not yet accessed the first node when the transfer of the second packet at the output from the first node was temporarily stopped, can access this first node.

In the case in which at least a third data packet associated with a channel with higher priority level than the second channel accesses the first node and is getting ready to access said output from the first node, after the arbitration step and prior to transfer of the second packet, the method may also include:

transfer of the entire said third packet at the output from the first node, before the transfer of the entire second packet.

In the case in which the third packet is associated with a channel with priority level equal to the priority level of the first channel, said transfer of the entire said third packet at the output from the first node may be made after the transfer of the entire first packet and prior to transfer of the entire second packet.

If the third packet is associated with a channel with a priority level higher than the priority level of the first channel, said transfer of the entire said third packet at the output from the first node may be made prior to transfer of the first packet.

According to a second variant of the data transmission method in which the first data packet and the second data packet are associated with the same priority channel in step a), the arbitration of the transfer order may also be determined as a function of the order of arrival of the first node, the first packet and the second packet. For example, a first come, first served" type arbitration could be used.

The arbitration of the transfer order may also be determined as a function of the input of the first node through which the first packet and the second packet accessed this first node. For example, in the case of a node with a "north" input, an "east" input, a "west" input and a "south" input, one possible arbitration would be "north" input has priority over the "east" input that has priority over the "south" input that has priority over the "west" input.

If, during the arbitration step, a first group of data in the first data packet and another group of data in the second packet have already accessed the first node and are getting ready to access an output or the same output of the first node, and a second data group in the second data packet has already been transferred to the output of the first node or has already been output from the first node, the method may also include the following after the arbitration step:

transfer of the second data packet at the output from the first node, transfer of the first data packet at the output from the first node after the entireness of the second packet has been transferred at the output from the first node.

If at least one third data packet associated with a channel with a priority level higher than the channel with which the first packet and the second packet are associated, accesses the first node after the arbitration step and before the transfer of the entire second packet, and is getting ready to access said output of the first node, the method may also comprise:

transfer of the entire said third packet to the output of the first node, before the step to transfer the first data packet to the output of the first node.

If the third data packet access is made before or during the step to transfer the second packet, the method may also comprise transfer of the entire said third packet to the output of the first node, before the step to transfer the entire first packet.

Data routing in the network may be of the deterministic type.

Thus, according to one embodiment in which the first packet and the second packet are designed to follow a first path in the network and a second path in the network respectively, the method may also comprise determination of the first and second paths before the first packet and the second packet are sent.

The route or the path that will be used by the data packets transiting in the network may have been assigned by the resource(s) that sent these data.

Thus, according to one possible embodiment of this variant, the method may also comprise the following before step b):

a resource assigns data for the first path to the first packet, and a resource assigns data for the second path to the second packet.

Routing or path data assigned to a packet may also be in the form of an ordered list of direction data that the packet will follow in the network. Thus, data for said first path may be in the form of a first ordered list of direction data that the first packet will follow in the network, while data for said second path are in the form of a second ordered list of directions that the second packet will follow in the network.

According to one possible embodiment of the method, it may also comprise:

modification of the first ordered list of direction data by the first node before the first packet is transferred to the output of the first node, and the second ordered list of direction data before the second packet is transferred to the output of the first node.

The network may be globally asynchronous. Thus, one or several network elements, for example one or several nodes may be controlled by a first clock, while one or several network elements, for example one or several resources or one or several other network nodes are governed by a clock different from the first clock or by a clock that is not synchronous with the first clock. Thus, the invention uses a method of designing a network on chip comprising:

separate production of at least one first network block comprising at least one node and/or at least one resource associated with a first clock, and at least one second network block comprising at least another node and/or at least another resource associated with a second clock independent of the first clock, assembly or association of the first and second blocks in the network.

According to one variant, the network may be globally asynchronous and provided with asynchronous elements, for example asynchronous nodes. Thus, one or several elements, for example one or several nodes, may be not controlled by a clock. Synchronization between asynchronous elements may be done locally, for example by a so-called "hand shake" signal or a "send/accept" type signal.

According to another possible embodiment of the data transfer method according to the invention, this method may also comprise:

at least one arbitration by at least one first network element, for example a first network resource, of an order to transfer this first resource to the output between at least a first data packet and at least a second data packet, the transfer order being determined at least partially as a function of a priority channel or priority channels with which the first packet and the second packet were associated by this first resource.

The invention also provides a method of designing a network on chip comprising:

the separate design of at least one first network block comprising at least one node and/or at least one resource associated with a first clock, and at least a second network block comprising at least another node without a clock, and/or at least another resource without a clock, assembly or association of the first and second blocks in a network.

The invention also relates to a network on chip device comprising a plurality of elements capable of communicating with each other, including a plurality of resources capable of processing data, and one or several nodes provided with one or several inputs and one or several outputs, capable of switching data to at least two elements in the network comprising:

means for sending data, capable of sending data in the form of packets comprising one or several elementary data groups, means for receiving data, capable of receiving data in the form of packets comprising one or several elementary data groups, means for sending synchronization signals, using an asynchronous communication protocol, for example of the "send/accept" type, capable of sending at least one signal of a first type accompanying or associated with sending an elementary data group, means for reception of synchronization signals according to said asynchronous protocol, capable of receiving at least one signal of a second type, before reception of an elementary data group, also comprising:

means for authorizing sending an elementary data group of a packet following reception of a synchronization signal of the second type, and of authorizing reception of an elementary data group of a packet following reception of a synchronization signal of the first type.

According to one possible embodiment of the device, the signal of the first type associated with sending an elementary group of data, and this elementary data group, may be sent simultaneously.

Data packets transiting in such a device may each be associated with priority information or priority channel information. Said asynchronous protocol may contain priority information or priority channel information.

Thus, the first type of signal following said asynchronous protocol sent by the synchronization signal sending means and accompanying sending of an elementary group of data in a data packet, may comprise at least part of the priority information or the priority channel information with which the data packet is associated.

According to one possible embodiment of the device according to the invention, the invention may also comprise:

at least a first resource comprising priority association means capable of associating at least one priority channel chosen from among a predetermined set of priority channels, for example depending on the type of data contained in this packet, with at least one data packet that this resource will send.

at least one first element, for example a first node, also comprising:

arbitration means, capable of determining a transfer order at the output from the first node between at least one first packet associated with a priority channel and at least a second data packet associated with a priority channel arriving at the input of the first node, the transfer order being determined at least as a function of a corresponding priority channel or priority channels with which the first and the second packets were associated by a corresponding resource in the network.

The network may operate globally asynchronously.

Thus, according to one possible embodiment of the device, the first node may be controlled by a first clock, the network may include at least a second node controlled by a second clock, different from the first clock or that is not synchronous with the first clock.

The network on chip device may possibly be provided with one or several asynchronous nodes. According to one possible embodiment of the network on chip device, it may comprise one or several asynchronous nodes which are not controlled by a clock, and one or several synchronous nodes that are controlled by a clock.

According to one possible embodiment of the network on chip device, said first resource may also comprise:

means for assigning path data capable of assigning data related to the path that this packet will follow in the network, to at least one data packet that the first resource will send.

According to one embodiment of the network, in which the first data packet and the second data packet have each been associated with first path data, for example in the form of a first ordered list of directions to be followed, and with second path data, for example in the form of a second ordered list of directions to be followed, by a corresponding network resource, the first node may also comprise:

data routing means, capable of routing said first packet and said second packet, at least partially or totally depending on the path data with which the first packet and the second packet were associated by a network resource.

According to one embodiment of the network on chip device, the first node may also comprise means for memorizing path data.

According to one variant embodiment of the network on chip device, the first node may also comprise means for modifying path data, for example shifting these data. This shift can also be used to prepare path data for an adjacent node.

BRIEF DESCRIPTION OF THE FIGURES

This invention will be better understood after reading the following description of example embodiments, given purely for guidance and that are in no way limitative, with reference to the appended figures, wherein.

Identical, similar or equivalent parts of the different figures are marked with the same numbers so as to facilitate comparisons between the different figures.

The different parts shown in the figures are not necessarily drawn at the same scale, to make the figures more easily understandable.

DETAILED DESCRIPTION

Figure 1A:
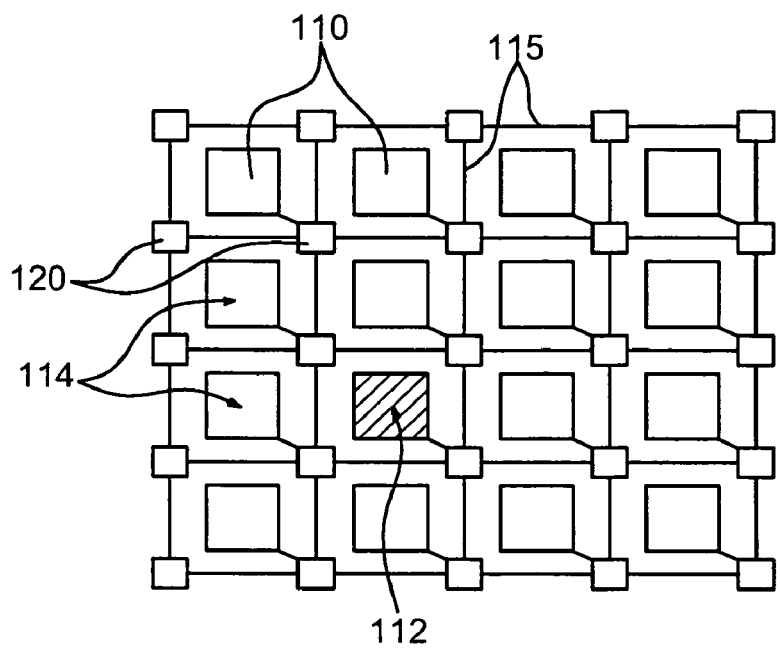
FIGS. 1A, 1B, 1C show examples of the network on chip architecture used according to the invention.

FIG. 1A shows an example of a communication or network on chip (NoC) architecture used according to the invention and provided with a matrix or "mesh" type topology.

This architecture comprises a plurality of elements referenced 110 capable of processing data, and communicating with each other particularly by exchanging data. The set of elements 110 included in such an architecture may include an element denoted 112 acting as master and used particularly to initiate communications on the network. This element 112 that will be called the "network controller" can thus program communications between a plurality of other network elements that will be called "resources" 114 and that can be used to perform tasks such as processing of elementary data, for example calculations, or for data storage or for encoding/decoding of data. The network controller 112 may for example be in the form of a processor or a micro controller. Some of the particular functions performed by the micro controller may include calculations and interrupt management. Each resource 114 may be generic, for example in the form of a processor or a Digital Signal Processor (DSP) or it may be specific, for example such as a memory, for example a Static Random Access Memory (SRAM) or a special purpose processing module, for example such as a module specialized in the calculation of a Fast Fourier Transform (FFT) or for example such as an MPEG (Moving Pictures Expert Groups) encoder and/or decoder module. Each resource 114 in the network structure comprises means or a part called a "functional core" dedicated particularly to data processing and/or calculations, and other means or another part called "network interface" and that is (are) used by the resource 114 to communicate with the network.

The network resources 114 are connected together and interchange data with each other through links 115 and nodes 120. The resources 114 in the network are also used to arbitrate a transfer order between different items of data or different data streams within them. Thus, each network resource may determine which of several data packets that it will send in output, will be transmitted in output first or will be transferred in output first.

The nodes 120 are used to set up a physical connection, for example using multiplexers, between one or several incoming links and one or several outgoing links, and communication switching between resources 114. With the so-called "mesh" or matrix topology illustrated in FIG. 1A, each node 120 is connected to four other adjacent nodes and is connected with or is associated with one of the resources 114.

For data switching, the nodes 120 can be used for data routing. Thus, a network node may determine the link or the adjacent node in the network to which data or a data packet that it receives should be sent.

The routing done within network nodes may be of the deterministic type. In this case, each node in the network can route one data packet only or principally, depending on routing information contained in the data packet that it receives. This routing information indicates the path that the data packet will follow in the network and it may have been input into said packet or assigned to the packet by a network resource that sent this packet.

The network nodes 120 are also capable of arbitrating between data. Thus, each network node may need to determine which of several data packets that it receives, should be transmitted or transferred first. Each network node may be designed to manage any conflicts between data arriving to it, and for example to determine which of several data or data packets arriving at it and intended to use the same output from this node or the same link attached to this node, will be transmitted to said output or said link first.

Advantageously, each node may be designed to arbitrate, possibly simultaneously, between several transfer orders or several packet transfer conflicts at several of its outputs.

Global operation or the global data transmission mode in the network may be asynchronous, such that the transmission or transfer of data in the network is not necessarily controlled by a global clock common to all nodes and/or all network resources. Thus, at least two nodes in the network and/or at least one node and one network resource may be governed by different clocks. One or several elements, for example one or several nodes, in the first block in the network may be controlled by another clock, while one or several other elements in the network, for example one or several nodes, in a second block may be governed by a clock different from the first clock or by a clock that is not synchronous with the first clock. According to one variant, one or several nodes in the network may be asynchronous and may not be provided with a clock.

The network on chip architecture used according to the invention is not limited to the mesh topology illustrated in FIG. 1A and it may have any other topology, for example a hypercube, tree, ring or torus type topology, etc . . .

Figure 1B:
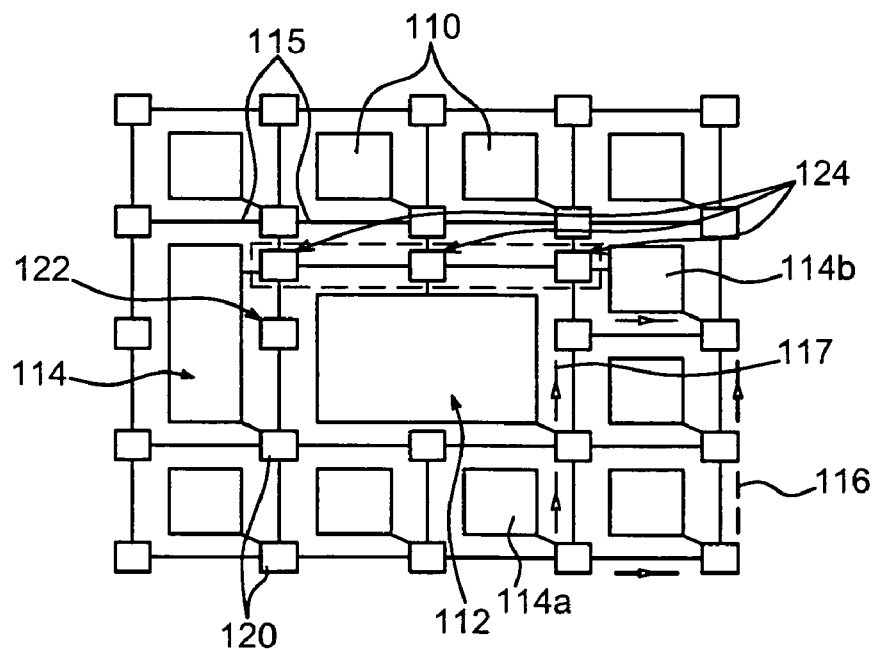

FIG. 1B shows a variant of the architecture that has just been described, in which there are additional nodes not in the mesh illustrated in FIG. 1A.

These additional nodes include some nodes called repeater nodes 122 that are not connected to a resource and act as "pipeline" in the network. These nodes 122 can increase the network throughput.

This variant network architecture may have been specially designed for an application or a set of processing for which latency constraints and flow constraints are predetermined or predicted. During the network design, other supplementary nodes or "special" nodes 124 may have been added in specific places or zones (delimited by dashed lines in FIG. 1B) in the network in which the data traffic will be high. These special nodes 124 can also enable the network to support predetermined or predicted flow and latency constraints.

Figure 1C:
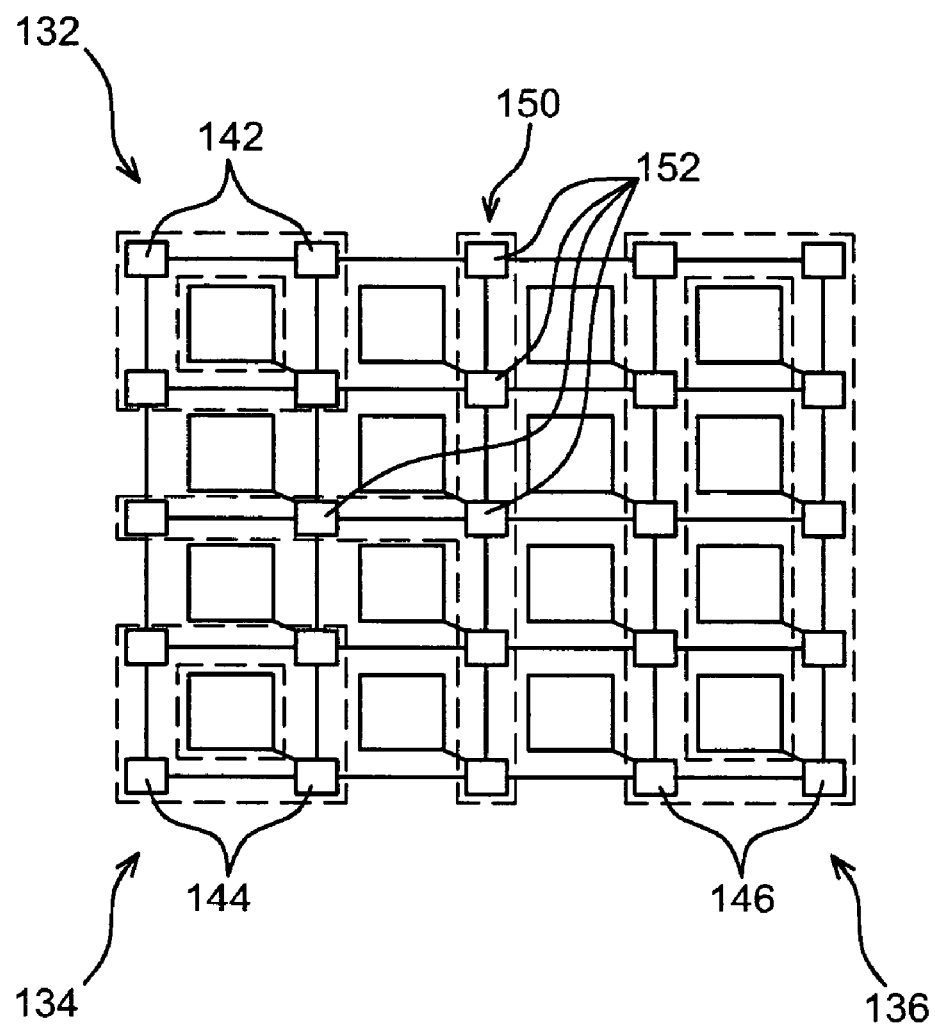

FIG. 1C shows a variant of one of the architectures that have just been described, which includes a set 150 (delimited by dashed lines in FIG. 1C) of asynchronous nodes 152 or nodes without a clock, and making a separation or an interface between several other sets 132, 134, 136 (also delimited by dashed lines in this Figure), each comprising synchronous nodes 142, 144, 146 or governed by a clock.

Such a network architecture variant may be more compact and faster to design than an architecture containing only asynchronous nodes or without a clock.

In either of the network architectures described above, data exchanged between resources 114 and that transit through links 115 and nodes 120, may be in the form of data packets. A packet may be formed from a data group commonly called flit, or several successive data groups or "flits" that will follow the same path. A flit is the elementary data transmission unit in the network. There is a capacity of a link 115 or a number of physical connections or wire connections included in a link 115, associated with an elementary flit or data group. A packet of data circulating in a network usually comprises at least one flit denoting its header, and at least one flit denoting its end, and possibly one or several intermediate flits between the header flit and the end flit. A data packet may possibly be formed from a single elementary data group and a single flit. In this case, this single flit denotes both the header and the end of packet. An elementary data group or flit may be formed from several bits, for example 34 bits, and in particular includes "information" bits used to denote the position of this flit in a packet.

A first information bit called the "bop" (begin of packet) bit may be used for example to denote whether or not the flit to which this "bop" bit belongs is a packet header flit.

A second information bit called the "eop" (end of packet) bit may be used for example to denote whether or not the flit to which this bit belongs is an end of packet flit.

The begin of packet "bop" information and the end of packet "eop" information may be implemented by a different encoding. For example, a two-bit code can be used to denote whether a flit is an end of packet flit or a begin of packet flit or an intermediate flit, depending on the value of these two bits.

A data packet flit may also comprise several other data bits apart from the information bits, for example another 32 bits, comprising information about a calculation of data processing and/or address information, and/or programming information that will be used to configure operation of a resource 114.

A header flit for a data packet, apart from the position information bits, includes several specific bits that will be called "control bits" for example 14 control bits, particularly to show a configuration and/or a command for a resource receiving this header flit, for example a write data command or a read data command.

A data packet header flit also includes several other specific "routing" bits, for example 18 routing bits. In the header flit, the routing bits indicate a path that may be the complete path that the data packet to which this header flit belongs will use in the network. This path may be in the form of an ordered list of direction data, each direction data being encoded on several bits.

For example, in one case of a network with a mesh topology like that described with reference to FIG. 1, in which network nodes may be connected to a "north" adjacent node, an "east" adjacent node, a "south" adjacent node and a "west" adjacent node and to a resource respectively, a direction data item may be encoded on two bits. The two bits of this direction data item may then for example indicate a "north" direction when their value is "00", an "east" direction when their value is "01", a "south" direction when their value is "11", a "west" direction when their value is "10". Thus, for example in the case of a packet comprising 18 routing bits, a list of 9 directions may be provided each encoded on two bits. It could be arranged such that two identical direction data, for example two consecutive values "11" and "11" in the list, or two consecutive values "10", "10" in the list, indicate that the packet should be routed to a resource.

In order to route data packets, it could be arranged such that when network nodes receive a packet, each node reads or decodes direction data located at a given predetermined position in the ordered direction list, for example direction data positioned at the end of the list, and then modify or shift the order of the ordered list for an adjacent node, such that after the shift, another direction data located at said predetermined data position indicates the routing to be done for said next adjacent node.

Thus for example, in the case of a packet comprising 18 routing bits, and a list of 9 directions each coded on two bits, each network node may be designed such that when it receives the packet, it reads or decodes the 2 low order routing bits, and then modifies the order of the routing bits for the next node, such that the two routing bits that were located before the low order bits prior to the shift, become the two low order bits after this shift.

As described above, particularly in order to reduce the number of routing bits in a packet, a specific code for routing bits can be used to notify a node to route a data packet towards a resource.

Each network node may be designed such that when it receives a packet, it can read or decode a first direction data located at the end of the ordered direction list of this packet, and then read and decode the next direction data in the ordered list of direction data, and if the next direction data is identical to the first direction data, route the packet towards the corresponding resource.

Thus, for example in the case of a packet comprising 18 routing bits and a list of 9 directions each coded on two bits, a network node may be designed such that when it receives the packet, it reads or decodes the two low order routing bits, then reads or decodes the two routing bits following the 2 low order routing bits, and if the two low order routing bits and the two routing bits following the 2 low order routing bits are identical, it transfers the packet towards the resource to which it is connected.

As mentioned above, concerning the routing of data packets in the network, the network may be of the deterministic type. Thus, before sending a data packet, a resource may set up a path that this data packet will follow. To achieve this, the resource attributes may for example assign a value to the routing bits of the header flit of the data packet that it sends.

When a first network resource 114a sends a first data packet at a time $t_1$ to a second network resource 114b, the first data packet may use a path (denoted by a dashed arrowed line reference 116 in FIG. 1B) between the first resource 114a and the second resource 114b, set up by the first resource 114a. A network node at which the first data packet arrives, then routes this first data packet solely or principally as a function of the routing bits of the header flit. A different path (denoted by a dashed arrowed line reference 117 in FIG. 1B) could be set for another send of a second data packet to the second resource 114b by the first resource 114a at another time $t_2$ different from time $t_1$.

A preliminary routing calculation can be made, for example by the network controller or by a processor external to the network, so that a given network resource can assign data to a packet that this resource will send, about the path that this packet will follow in the network.

This calculation may be made using an adapted routing type algorithm commonly called a "deadlock free" algorithm, for example of the type described in the document entitled "*The Turn Model for Adaptative Routing*, C. J. Glass", L. M. Ni, Association for Computing Machinery, 1992. Once the calculation has been made, the network controller can send the calculation result to the given resource.

Depending on this result, the given resource associates a path with the data packet, for example by assigning a value to the routing bits of the header flit for this packet.

The data stream that will pass through one of the networks previously described during processing or an application, may be of the type commonly called a "wormhole", for example like that described in the document "*A survey and comparison of wormhole routing technique in Mesh networks*", K. M. Al-Tawil et al., IEEE network, March-April 1997, pp. 38-45). For this type of data stream, the header flit firstly determines the path between the sending resource and the receiving resource in a data packet sent by a sending resource towards a receiving resource, possibly followed by one or several intermediate flits, distributed in network nodes previously used by the header flit. The end flit closes the path followed by the data stream.

Figure 2:
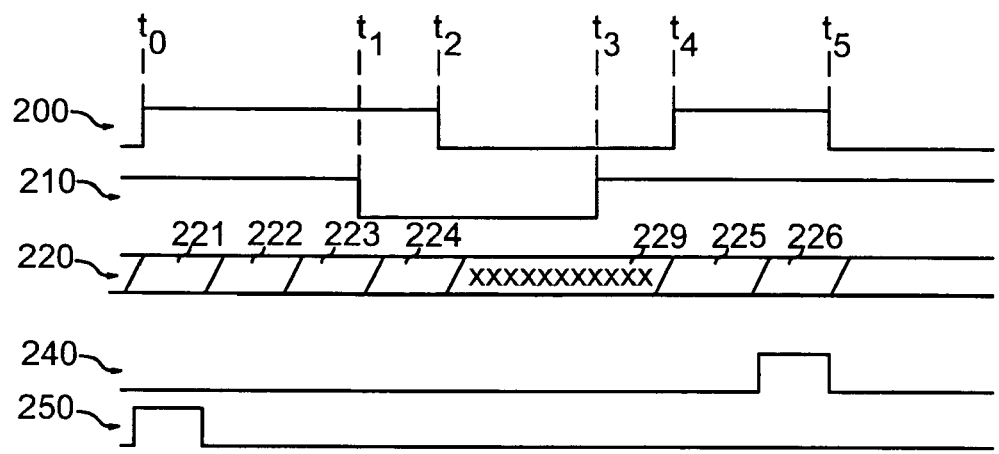
FIG. 2 shows an example of a time diagram illustrating a synchronization mechanism using a "send/accept" type protocol in a network on chip used according to the invention, between a data sending element and an element receiving said data.

A synchronization mechanism between an element in the data sending network, for example a first node and an element in the data receiving network, for example a second node or a resource, is illustrated by the time diagram in FIG. 2. The data transfer between the sending and the receiving element is governed by a synchronization type protocol called "send/accept" so that a given flit or an elementary group of data in a data packet may be sent by the sending element while another flit preceding this given flit in said packet was accepted by the receiving element.

The curves 200 and 210 in the time diagram are representative of synchronization signals exchanged between the sending element and the receiving element. The curve 220 is representative of data exchanged between the sending element and the receiving element.

On this time diagram, a sending signal 200 that will be called the "send" signal and that originates from the sending element, announces at time $t_0$ for example when this "send" signal changes to a high state, that the data are sent to the receiving element. An acceptance signal 210 that we will call the "accept" signal originating from the receiving element indicates that the receiving element is ready to receive this data, for example by being in a high state at this time $t_0$. Thus, as indicated by curve 220, a first data group or a first flit is sent by the sending element and received by the receiving element (the first flit being represented by a portion 221 in the curve 220).

A curve 250 in the time diagram representative of a "bop" signal changes to a high state at time $t_0$ and remains in the high state during the duration of the first flit. This "bop" signal indicates that the first flit is a header flit. A second flit, and then a third flit, are then sent by the sending element and are received by the receiving element (the second flit and the third flit sent being represented by the portions 222 and 223 respectively of the curve 220).

At time $t_1$, the "accept" signal 240 emitted by the receiving element changes state, for example changes to a low state. The receiving element then stops receiving data. The sending element makes an attempt to send a fourth flit (portion 224 of the curve 220) but the receiving element does not return an acceptance signal for this fourth flit to the sending element. In one case, for example, in which the receiving element is a synchronous node, this node can receive and record the fourth flit while waiting to use it. In another case, for example, in which the receiving element is an asynchronous node, this node can keep the fourth flit in the sending element, not acknowledging this fourth flit.

After this attempt to send at a time $t_2$, the sending element then stops sending data (portion 229 in the curve 220).

The receiving element is once again ready to send data starting at a time $t_3$. This is indicated by the "accept" signal (curve 210) that changes state and for example changes to the high state. Starting from this time $t_3$, the receiving element indicates that it will then accept the fourth flit. The sending element can then send data once again. Starting from a time $t_4$, the element sends a fourth flit (portion 225 in curve 220) and then a fifth flit (portion 226 in curve 220) that are then received by the receiving element. As indicated, the curve 240 representative of an "eop" (end of packet) signal, the fifth flit marks the end of the packet and sending data at a time $t_5$.

Each data packet transiting in the network may then be associated with priority level or priority channel information called a "virtual channel" chosen from among a predetermined list of at least two different virtual channels, for example two different virtual channels or three different virtual channels. Each virtual channel relates to a priority level or a priority number, and assigns a degree of priority to a data packet with which it is associated, particularly concerning arbitration of the packet transfer order, when this packet reaches the output of a resource or when this packet reaches a node in the network.

A data packet may be associated with a virtual channel by a resource that sent this packet in the network.

The priority channel information with which a data packet may be associated, may be at least partially contained in synchronization signals of the "send/accept" type synchronization protocol described above with reference to FIG. 2, and particularly in "send" type signals accompanying elementary data groups of the packet being sent. Thus, a first packet associated with a first priority channel and a second packet associated with a second channel with a priority different from the first channel, may be accompanied by synchronization signals and particularly different "send" type signals.

In a first network element, for example a first resource, a first data packet within this first resource and for example associated with a first channel with a given priority level, may be transferred at the output from this first resource, taking priority over another data packet in the first resource and for example associated with a second channel, with a priority level lower than the first channel.

For example at a first network node, a first data packet accessing this first node and for example associated with a first channel with a given priority level can be transferred at the output from this node, taking priority over another data packet for example associated with a second channel with a lower priority level than the first channel, particularly in the case in which the first packet and the other packet are preparing to access the same output from the first node.

If, when the first packet associated with the first channel accesses the first node, while a transfer of the other packet associated with the second channel has already begun at the output from the first node, the first packet can also be transferred in priority over the other data packet.

According to one possible implementation of the virtual channels, there may be three different virtual channels, for example a first channel with the highest priority level, a second channel with a lower priority level than the first channel, and a third channel with a priority level lower than the first channel and the second channel.

Association of a data packet with a virtual channel or a priority channel can depend particularly on the type of data contained in this packet.

For example, the first channel can be reserved for a first data type, for data packets comprising interrupt data. The second channel can then for example be reserved for a second data type with a priority level lower than the first data type, for example data packets containing programming data or operating configuration data for resources. The third channel may for example be reserved for a third type of data, with a priority level lower than the first type and the second type, for example data packets containing data addressed to resources and related to calculations or processings that these resources will perform.

The association of a data packet with a virtual channel or a priority channel may also depend particularly on the type of service to be linked to this packet.

The virtual channels can be used to provide different data transfer services in the network, for example at least one service called the "best effort" service, for which the bandwidth or network access is shared or distributed approximately equitably between the resources, and at least one service called "guaranteed latency" service, in which data associated with this service are transferred in the network, for example from a first resource to a second resource, with a preferably constant or only slightly varying transfer duration.

Thus, for an implementation with two virtual channels, the highest priority level channel, for example the first channel, can be used to provide a guaranteed latency service, while the second channel with a priority level lower than the first channel, can be used to provide a "best effort" type service.

According to one variant, and following the example, with three virtual channels as described above, the highest level priority channel, for example the first channel, may be used to provide a guaranteed latency service associated with data packets comprising a priority data type, for example interrupt data. The second channel and the third channel may be used to provide a "best effort" service and be associated firstly with data packets comprising a data type with priority level lower than the first channel, for example configuration data, and secondly data packets comprising a data type with a priority level lower than the first channel and the second channel, for example calculation data.

Particularly when packets access the same node in the network, it is possible for a data packet associated with a virtual channel, for example a first data packet associated with a first virtual channel, to interrupt another data packet associated with another virtual channel with a lower priority level, for example a second data packet associated with a second channel with priority level lower than the first channel. Thus, a case can arise in which one or several flits, or even all flits in the first packet associated with the first channel can pass through the node before the complete second packet has passed through the node, even if one or several flits in the second packet associated with the second channel have passed through the node.

Another possible arrangement is that two data packets associated with the same priority channel, for example a first packet associated with the first channel and a third packet also associated with the first channel, will not mutually interrupt each other, particularly when these packets access the same node in the network.

We will now describe an example transmission or data transfer method in a network on chip used according to the invention, with reference to FIGS. 3A-3F.

In particular, this data set will pass through a network portion comprising nodes 340, 350, 360, each provided with several inputs, for example 4 inputs and several outputs for example 4 outputs (only a "north" input and an "east" input being shown for each of these nodes in FIGS. 3A-3F).

Said data set comprises in particular a first data packet 310 provided with a header flit 312 followed by a second flit 314, then a third flit 316 and a fourth flit 318. This set of data also comprises a second data packet 320 and a third data packet 330, also each including a heading flit denoted 322 for the second packet 320 and 332 for the third packet 330, followed by three other flits denoted 324, 326, 328 for the second packet 320, and denoted 334, 336, 338 for the third packet 330.

The second packet 320 and the third packet 330 are each associated with a first virtual channel, while the second packet 320 is associated with a second virtual channel with a priority level lower than said first virtual channel.

Figure 3A:
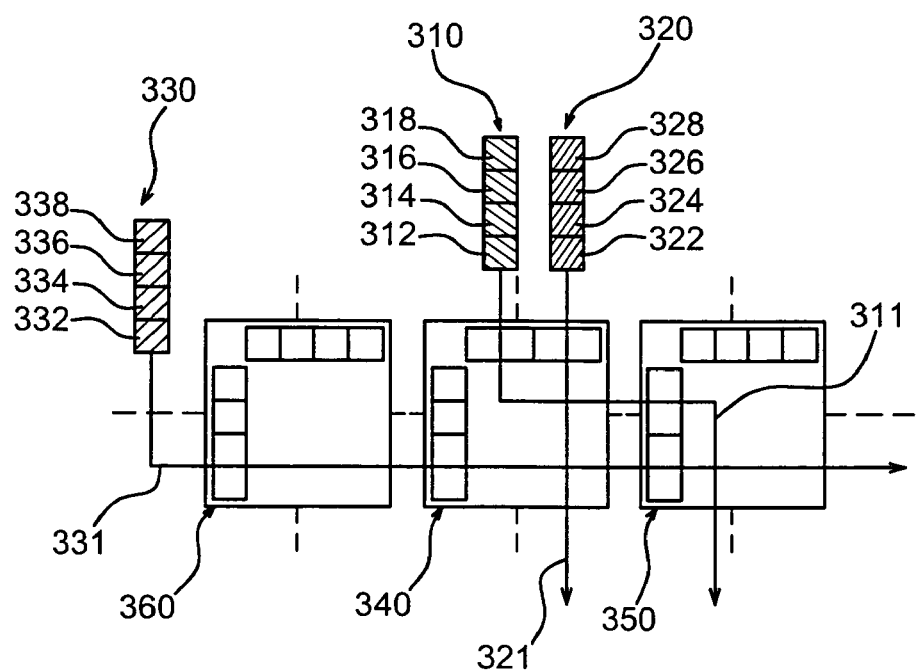
FIGS. 3A-3F represent the different steps in an example of a data transfer method.

The corresponding paths followed by the first packet 310, the second packet 320, and the third packet 330 in the same network portion are represented by arrowed lines denoted 311, 321, 331 respectively in FIG. 3A.

The first packet 310 and the second packet 320 are preparing to access a first node 340 in the network and will use different outputs from this first node 340 towards different links in the network.

The first packet 310 is intended particularly to access the first node 340 and then a second node 350 adjacent to the first node 340. The third data packet 330 is preparing to access another node 360 adjacent to the first node 340, and is then also intended to access the first node 340 and then the second node 350.

Figure 3B:
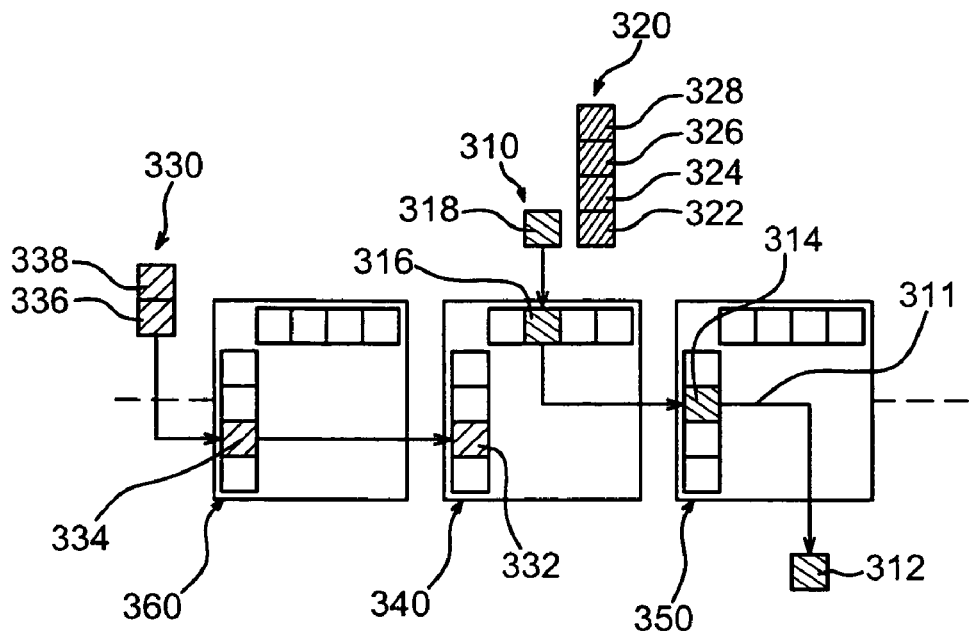
Figure 3C:
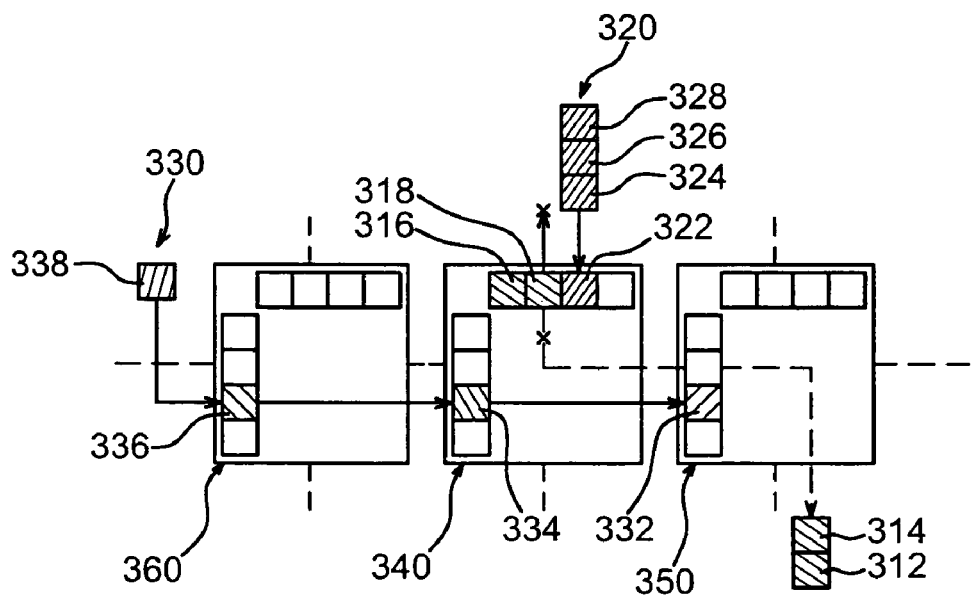

In FIG. 3B, the transfer of the first packet 310 and the third packet 330 has begun and each of these packets has already accessed the first node 340, while the second packet 320 is still preparing to access this first node 340. An arbitration between the first packet 310 and the third packet 330 can then be performed at the first node 340 to determine the transfer order of each of these packets.

The header flit 312 and the second flit 314 in the first packet 310 have already passed through the first node 340 and accessed the second node 350, while the third flit 316 of this first packet 310 has accessed the first node 340 and is preparing to be transferred to the output of the first node 340 towards the second node 350. The fourth flit 318 in the first packet 310 is preparing to access the first node 340.

At the same time, the third packet 330 and particularly its header flit 332, have also accessed the first node 340. Like the third flit 316 in the first packet 310, this header flit 332 is preparing to be transferred to the output of the first node 340, towards the second node 350.

The header flit 332 in the third packet 330 and the third flit 316 in the first packet 310 being intended for the same output from the first node 340, a conflict arises between the first packet 310 and the third packet 330.

Since the third packet 330 is associated with a virtual channel with a higher priority level than the second channel with which the first packet 310 is associated, the transfer of the first packet 310 towards the second node 350 is stopped. In particular, the third flit 316 of the first packet is stopped (the stop being notified by a cross in FIG. 3C). At the first node 340, the stop may be accompanied by a change of the acceptance signal to a low state, according to the "send/accept" protocol described above with reference to FIG. 2.

At the same time (FIG. 3C), the transfer of the third packet 330 continues such that the header flit 332 of the third packet accesses the second node 350 and the second flit 334 of the third packet 330 accesses the first node 340.

Also at the same time, following the arbitration made by the first node 340, the transfer of the second packet 320 also continues (FIG. 3C) such that the header flit 322 of the second packet 320 accesses the first node 340.

Although the transfer of the first packet 310 to the second node 350 is stopped, the fourth flit 318 of the first packet 310 which before arbitration had not yet accessed the first node 340, can also access the first node. The second flit 314 in the first packet 310 that was still at the second node 350 before the arbitration, can move and exit from the second node 350 (the displacement of the second flit being marked in FIG. 3C by an arrow in front of a block reference 314).

Thus, the first packet 310 is separated into two parts by the third packet 330 with a higher priority channel. Thus, a part of the third packet 330 is located in the first node 340, while another part is located in another link or in another node (not shown in FIG. 3C) that is not adjacent to the first node 340.

Since the second packet 320 and the third packet 330 are intended to access different nodes at the output from the first node 340, these packets do not come into conflict. The transfer of the second packet 320 and the transfer of the third packet 330 can then continue during a step illustrated in FIG. 3D. At the same time, the transfer of the first packet 310 at the output from the first node 340 and addressed to the second node 340, is still stopped.

For the second packet 320, the second flit 324 in this second packet 320 accesses the first node 340 during this step, while the header flit 322 is transferred to the output of this first node 340.

Figure 3D:
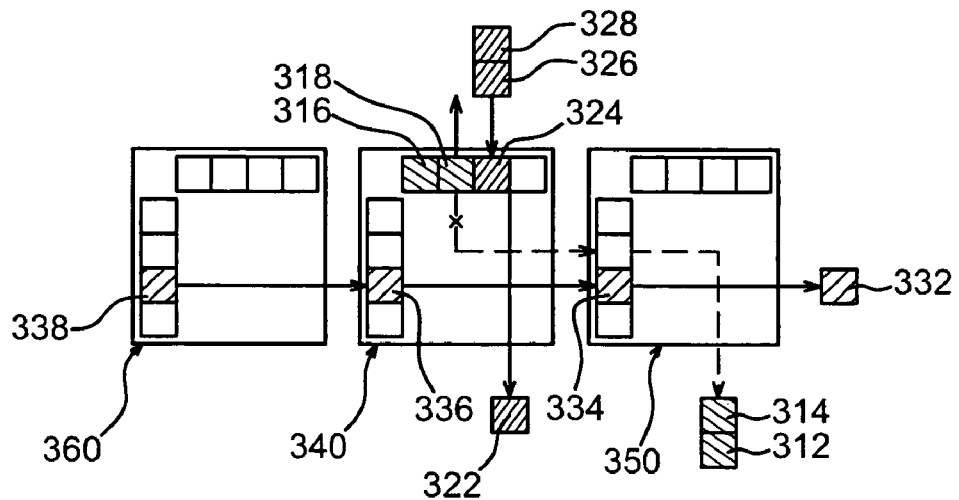
Figure 3E:
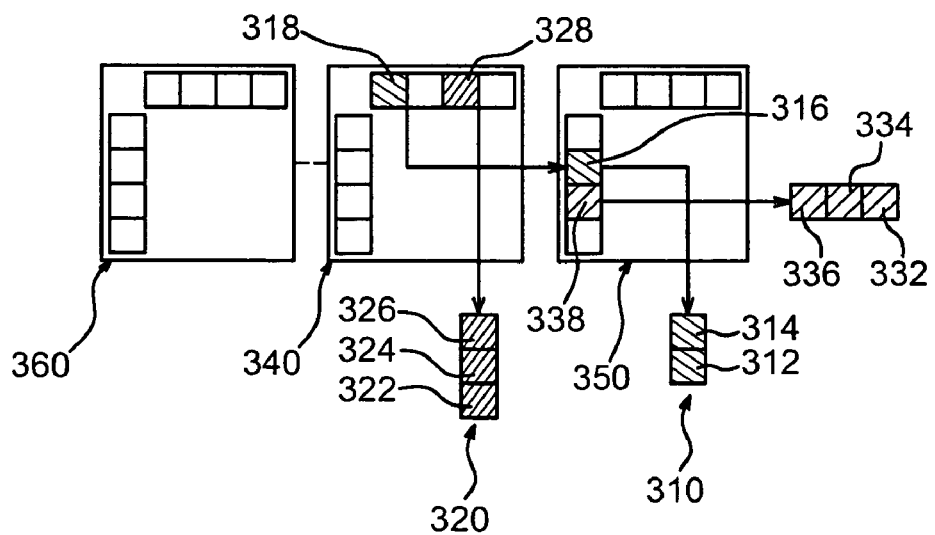

Concerning the displacement of the third packet 330, the header flit 332 of the third packet 330 has exited from the second node 350, while the second flit 334 in the third packet 330 has exited from the first node 340 and accesses the second node 350 and the third flit 336 accesses the first node 340 (FIG. 3D).

The third packet 330 in its entirety then exits from the first node 340 and releases the output for which it was in conflict with the second packet 320. The transfer of the second packet 320 at the output from the first node 340 can then resume in a step illustrated in FIG. 3E. A flit 316 of the first packet 310 then accesses the second node 350. At the same time, the displacement of the third packet 330 continues. The fourth flit 338 and the last flit in the third packet have already accessed the second node 350.

Figure 3F:
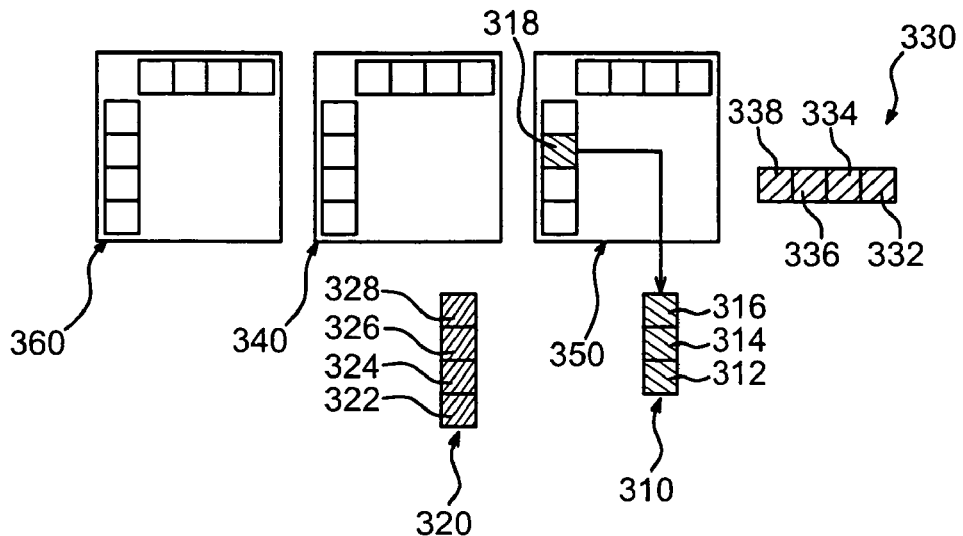

According to a step illustrated in FIG. 3F, the transfer of the first packet 310 at the output from the first node 340 was completed after the transfer of the second packet 320 and the third packet 330. This first packet 310 was transferred in full at the output from the first node 340, and may have entirely reached the second node 350 in full. The transfer of the second packet 320 at the output from the first node 340 is also complete. The transfer of the third packet 330 at the output from the second node 350 is also complete.

Figure 4A:
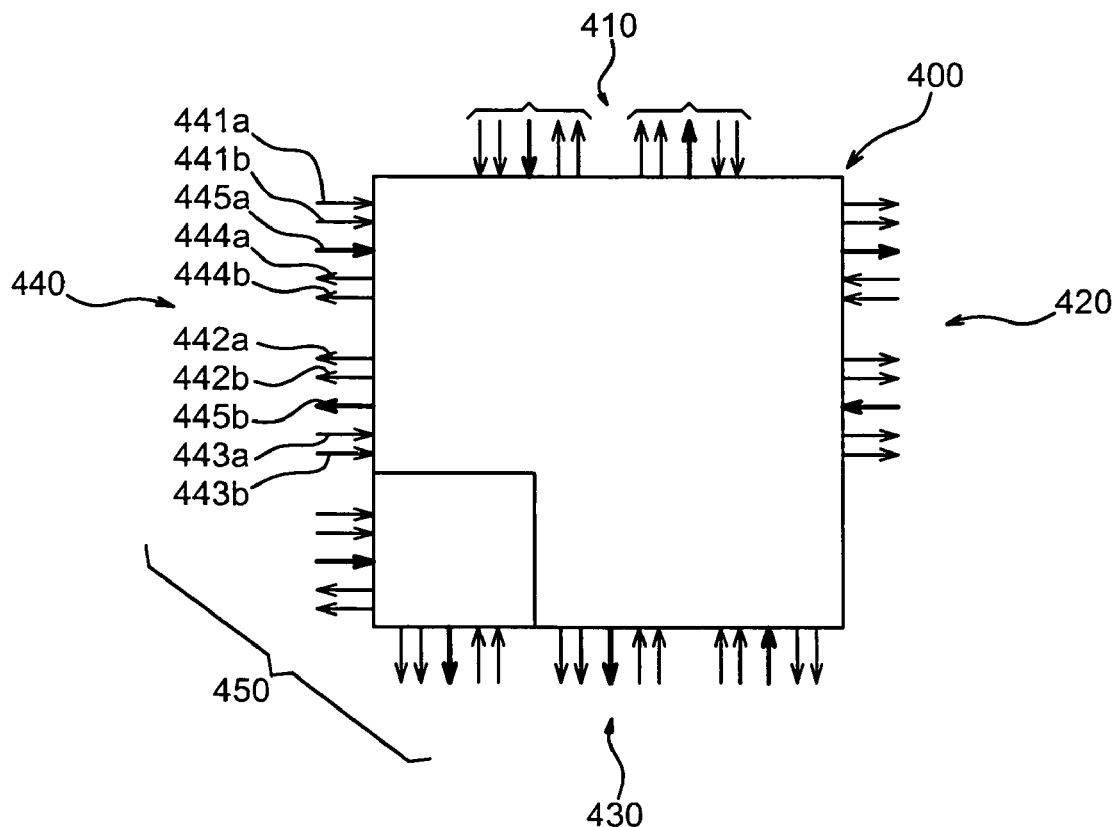
FIGS. 4A-4C represent an example of a data switching node structure in a network on chip used according to the invention.
Figure 4B:
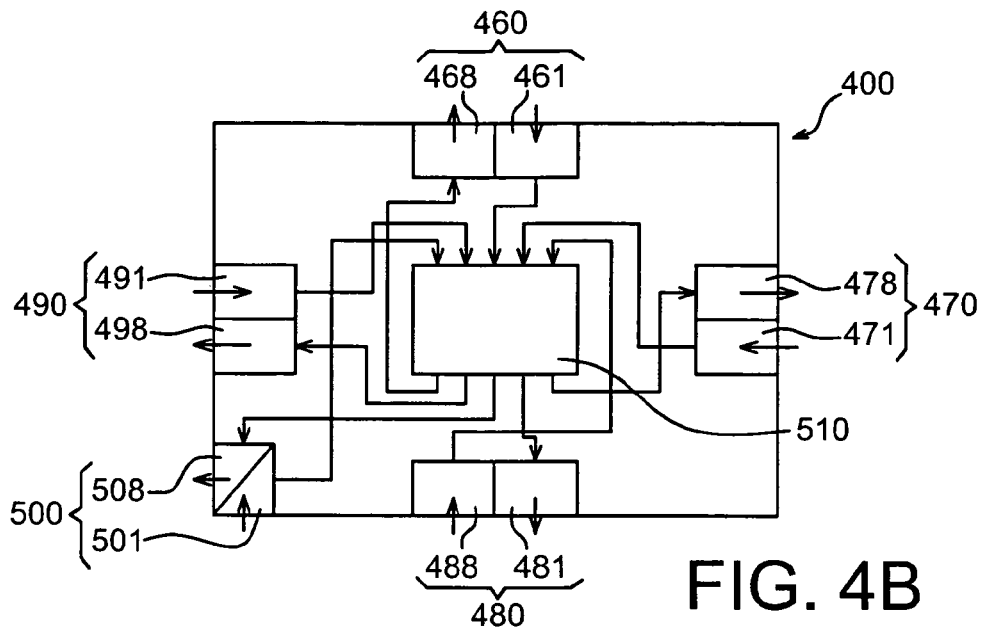
Figure 4C:
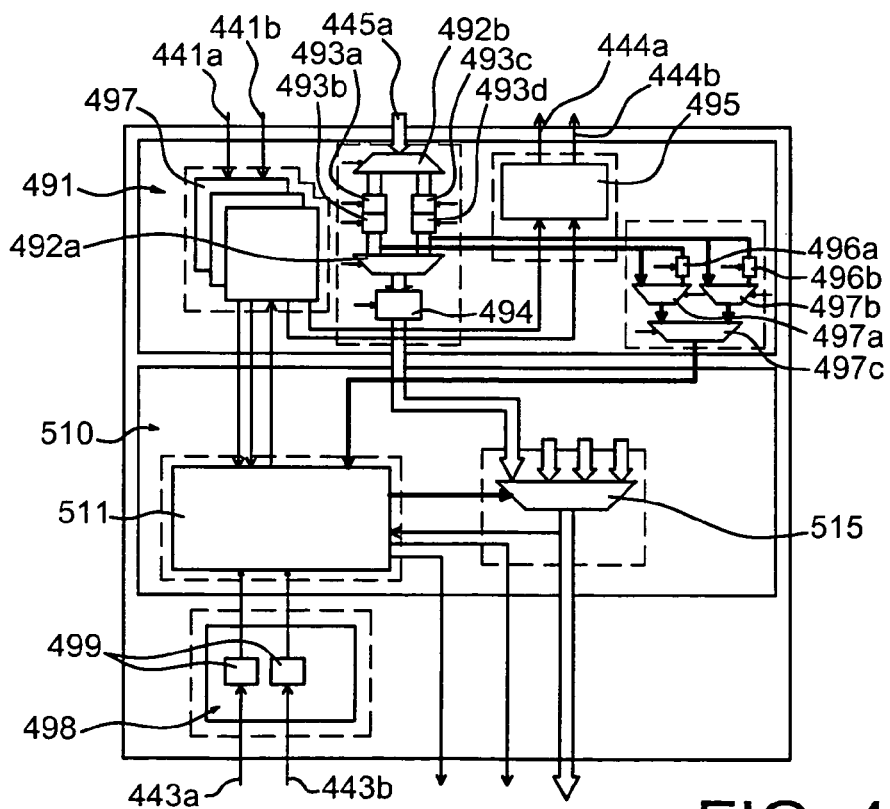

An example node 400 of a network on chip used according to the invention, will now be presented with reference to FIGS. 4A-4C. This node may be provided with its own clock (not shown) independent of the clocks of the other nodes on said network.

This node 400 comprises five input/output units 410, 420, 430, 440, 450, (represented in FIG. 4A) each connected to a corresponding input/output module 460, 470, 480, 490, 500 (shown in FIG. 4B).

The input/output units include a "north" unit 410, an "east" unit 420, a "south" unit 430 and a "west" unit 440, each of which can be connected to another node in the network, adjacent to node 400 (the other nodes not being shown in FIGS. 4A-4C) and designed to make data exchanges and/or synchronization signal exchanges with this other node.

Another input/output unit 450 at node 400 can be connected to a network resource (not shown in FIGS. 4A-4C) and is designed to make exchanges of data and/or synchronization signals with this resource.

Like the "west" unit 440 shown in more detail in FIG. 4A, each input/output unit of node 400, may comprise:
one or several inputs, for example two inputs 441a, 441b, connected to their corresponding input module (the input/output modules and particularly the "west" input/output module not being shown in this figure) and designed to receive "send" type synchronization signals according to a "send/accept" type protocol for which the operating mechanism has been described above with reference to FIG. 2, originating from another node (not shown) in the network adjacent to node 400,
at least one input 445a connected to its corresponding input/output module, and designed to receive data or flits from said other node,
one or several outputs, for example two outputs 444a, 444b, connected to their corresponding input/output module and design to send "accept" type synchronization signals using the same "send/accept" protocol to said other node (not shown) on the network.
one or several outputs, for example two outputs 442a, 442b, connected to their corresponding input/output module, and designed to send "send" type synchronization signals according to the same "send/accept" protocol towards said other adjacent node in the network.
at least one output 445b, connected to its corresponding input/output module and designed to receive data or flits from said other node.
one or several inputs, for example two inputs 443a, 443b, connected to their corresponding output module, and designed to receive "accept" type synchronization signals according to the same "send/accept" protocol originating from another node in the network (not shown).

In FIG. 4B, the node 400 is shown with its five input/output modules 460, 470, 480, 490, 500, and a central module 510 to which each of these input/output modules is connected. Arrowed lines on this FIG. 4B, represent paths that data or flits passing through the node 400 may follow within the node 400.

The input/output modules include a "north" module 460 provided with a "north" input module 461 and a "north" output module 468, an "east" module 470 provided with an "east" input module 471 and an "east" output module 478, a "south" module 480 provided with a "south" input module 481 and a "south" output module 488, a "west" module 490, another module 500 provided with an input module 501 and an output module 508. The five input/output modules 460, 470, 480, 490, 500, are connected to a "north" input/output unit 410, the "east" input/output unit 420, and the "south" input/output unit 430, the "west" input/output unit 440 (the input/output units not being shown in FIG. 4B).

The central module 510 associated with the input/output modules 460, 470, 480, 490, 500, are used particularly to produce or process "send" type synchronization signals and/or "accept" type synchronization signals to or from other nodes adjacent to node 400. The central module 510 may also be used to route data packets reaching node 400, determining the corresponding output of node 400 through which each of these packets will be transferred.

A data packet arriving at node 400 may be routed by this node 400 as described above, as a function of routing information that may be in the form of an ordered list of direction data that the packet will follow in the network.

This routing information may be included only in the packet header. Thus, the node 400 may keep packet routing information as long as an end of packet "eop" information or signal has not reached it. After having recovered specific routing information concerning it in a packet, the node 400 may possibly delete this specific routing information.

The node 400 is used so that when it receives a data packet, it reads or decodes some routing information, for example the direction data located at the end of the ordered list of direction data, and it then modifies the ordered list of directions, particularly so as to prepare routing for an adjacent node located after the node 400 in the path of said packet. As was described above, this preparation may be done by shifting the ordered list of direction data.

The central module 510 of the node 400 may also be used to make data arbitration, by determining a transfer order between several flits or packets of flits reaching it.

As described above, the arbitration between several data packets is performed at least partly depending on the virtual channels with which each of these data packets are associated. The central module 510 can make a differentiation between different priority channels, for example by association of different "send/accept" synchronization signals for each virtual channel.

The transfer order between several data packets, when these packets are associated with channels with different priorities, may be determined solely as a function of their corresponding virtual channels.

The transfer order between several data packets, when some of these packets are associated with channels with identical priorities, may also be determined using a "dynamic" arbitration. For such an arbitration type, the corresponding order of arrival of said packets at the input to node 400 is also considered. This dynamic arbitration may for example be of the "first come first served" type and it may be done by the node 400, particularly for example to determine the transfer order between several data packets reaching it and associated with the same priority channel.

A transfer order using a "static" type arbitration may also be used by the node 400, in addition to that done using virtual channels. For this type of arbitration, the node 400 takes account of the adjacent node from which said data packets arrive or from which of its inputs the packets arrive. This type of static arbitration may be used particularly in addition to the arbitration done using virtual channels, for example to determine the transfer order between several different packets associated with the same virtual channel and arriving simultaneously or approximately at the same time at node 400.

For example, such a static arbitration may be of the "north/east/south/west" type for which a packet originating from the "north" input of node 400 takes priority over a second packet from the same virtual channel arriving at the same time as the first packet at the "east" input to node 400, the second packet itself taking priority over a third packet from the same virtual channel arriving at the same time as the second packet at the "south" input of the node 400.

One possible operation of the node 400 may be as follows: on arrival of a header flit of a first data packet through an input to node 400, the output from node 400 that this packet will follow is determined as a function of routing information contained in the header of said first packet. An arbitration function is then activated.

If there is no conflict on said output, and for example there is no other packet using this output or getting ready to use this output, the first packet is transmitted or transferred to this output.

If there is an access conflict on said output, and for example a second packet of the same virtual channel as the first packet, or a virtual channel with a priority level higher than the first packet is already using this output, the transfer of the first packet to the output from the node 400 is blocked or stopped. An "accept" type synchronization signal is set to the low state and is transmitted to the adjacent node of node 400 from which the first packet originates. The transfer of the first packet can resume when all flits in said second packet have passed through the node 400.

In another case in which there is a conflict on said output, and for example another header flit of a second packet belonging to the same virtual channel as the first packet is getting ready to use this output at the same time, a static arbitration, for example of the "north", "east", "south", "west" type is performed between the first packet and the second packet.

In the case in which there is a conflict on said output and a second packet belonging to virtual channel with a priority level lower than the first packet is already using this output, the transfer of this second packet at the output from node 400 is blocked. The first packet is then transmitted entirely at the output from node 400. The transfer of said second packet can then resume afterwards if required.

If one or more other packets associated with a channel with a priority level higher than the channel of said second packet, accesses node 400 in input before said second packet has been entirely transferred at the output from node 400, and if these other packets will use the same output as the second packet, said other packets are transferred in full to the output of the node 400 in priority over the second packet.

If said other packets are associated with a channel with a higher priority level than the channel of said first packet, and these other packets access the node 400 in input before the entire said first packet has been transferred to the output from node 400, and if these other packets will use the same output as the first packet, said other packets are transferred in full to the output of node 400 before the first packet.

A structure of the central module 510 of the node 400 and an input/output module, for example the "west" module 490 of node 400 is shown in FIG. 4C.

The "west" input/output module 490 includes an input module 491 to which the inputs 441a and 441b designed to receive "send" type synchronization signals are connected, originating from another node (not shown) adjacent to node 400.

The input module 491 is also connected to input 445a, designed to receive flits originating from said other node. The input module 491 is also connected to the outputs 444a and 444b, designed to received "accept" type synchronization signals originating from said other adjacent node. In this example with two inputs 441a and 441b and two outputs 444a and 444b to receive and send synchronization signals according to the asynchronous "send/accept" protocol, a virtual channel chosen from among two different virtual channels may be assigned to the packets.

The input module 491 comprises multiplexers 492a, 492b, buffer memories, for example in the form of FIFO (first in first out) units 493a-493b, and 493c-493d. These FIFOs 493a-493b and 493c-493d enable operation of the synchronization mechanism described above without sudden starts and stops. As described above, a unit 494 can be used to shift packet routing information, and particularly to shift the ordered list of direction data contained in this routing information.

The input module 490 is also provided with means 497 acting as a state machine, and particularly to manage scheduling of input packets and possibly interrupts of these packets, using the filling ratio of FIFOs 493a-493b and 493c-493d.

Combinational calculation means 495 are provided to produce "accept" type signals to be sent to the other adjacent node as a function of the state machine.

The input module 490 is also provided with means 496a, 496b, of memorizing incoming data packets and particularly to memorize routing information about these packets, and means 497a, 497b, 497c, for example multiplexers, to select a path for an incoming packet as a function of "send" type synchronization signals and the "bop" begin of packet bit associated with this packet.

A module enabling interfacing (not shown in FIG. 4C) between synchronous signals internal to the node and asynchronous signals for example of the "send" type and/or "accept" type originating from another node may also be used.

According to one embodiment, such a module may for example be provided with FIFOs and re-synchronization clocks.

According to another embodiment, such a module may include an interface like that described in the document by Simon Moore et al., <<Point to point GALS Interconnect>>, Proceedings of ASYNC 2002, p 69-75. This module can guarantee integrity of data entering the node.

Such an interfacing module may also be present in a resource (not shown) with which the node 400 is associated.

The "west" input/output module 490 also includes an output module 498 provided with means, for example two buffer memories 499, designed to delay "accept" type signals from a node adjacent to node 400. A module (not shown FIG. 4C) enabling interfacing between synchronous signals internal to the node and asynchronous signals may also be integrated in the output module 498.

The central module 510 includes arbitration and data switching means 511, the operation of which may be as described above. The arbitration and data switching means 511 control multiplexing means 513 to direct data incoming into node 400, towards one of the input/output modules of this node.

The node 400 that has just been described may be implemented in synchronous logic, for example using an "HCMOS9" technology from ST Microelectronics. Such a node 400 may have a high operating frequency, for example of the order of 200 MHz.

The number of memory registers necessary to make such a node may be smaller, for example 20 32-bit registers for FIFOs of input modules 461, 471, 481, 491, 501, and 10 2-bit registers to record routing information. This small number of registers can reduce the consumption of node 400, such that the global consumption of a network with nodes of the same type as node 400 is lower than it would be with devices according to prior art.

According to one variant embodiment of the node 400 described above, this node may be made without a clock.

Node 400 described above may have an asynchronous internal operation and for example may be implemented using a PivotPoint™ made by the FULCRUM company. In this case, the node may be designed to exchange with other nodes in the network or with a resource, using a four-phase synchronization protocol.

The invention claimed is:

1. Method of transmitting data in a network on chip formed from a plurality of elements capable of communicating with each other, the plurality of elements comprising a plurality of resources capable of processing data, and a plurality of nodes capable of connecting resources to each other and switching data in the network, each node being provided with a plurality of inputs and a plurality of outputs, the method comprising:

at least one transfer step using an asynchronous send/accept synchronization protocol, of at least one data packet associated with priority or priority channel information chosen among a set of several different priority channels and comprising one or several elementary groups of data, from a sending first element in the network to a receiving second element in the network, said send/accept synchronization protocol being configured to govern data transfer so that a given elementary group of data in a data packet may be sent by the first element while another elementary group of data preceding said given elementary group of data in said packet has been accepted by the second element, the transfer of one or several elementary data groups or all of the elementary data groups of said packet, being-associated with, a sending, by the first element of at least one send type signal according to said protocol, and being authorized by the second element sending at least one other accept type of signal according to said protocol, in response to the signal of the send type, said send type signal according to said asynchronous send/accept synchronization protocol at least partly comprising the priority or priority channel information with which said packet is associated.

2. Method of transmitting data in a network on chip according to claim 1, the method also comprising:

a) association, by a resource of the network, of priority data or a priority channel with at least one first data packet, and of other priority data or another priority channel with at least one second data packet, b) at least one arbitration by at least one first network element of a transfer order into the first element to the output, between the first data packet and the second data packet, the transfer order being determined at least partially as a function of the priority channels with which the first packet and the second packet were associated.

3. Method for transmitting data according to claim 2, in which the first element is a first node and in which the first data packet and the second data packet were associated respectively with, a first priority channel with given priority level, and a second priority channel with a priority level different from the priority level of the first channel, a first group of data in the first packet and another group of data in the second packet having accessed the first node and getting ready to access an output or the same output from the first node, and during step b), the transfer order between the first packet and the second packet being determined solely as a function of the priority level of the first channel and of the priority level of the second channel.

4. Method of transmitting data according to claim 2, in which the first element is a first node and in which the first data packet and the second data packet were associated respectively with a first priority channel, and with a second priority channel with a priority level lower than the first channel, a first group of data in the first packet and another group of data in the second packet having accessed the first node and getting ready to access an output or the same output in the first node, the method also including the following steps after step b):

c) transfer of the first data packet at the output from the first node, d) transfer of the second data packet at the output from the first node, after the entire first packet has been transferred at the output from the first node.

5. Method of transmitting data according to claim 4, also including the following step after step b) and before step d):
the second packet is at least partially stopped at the first node.

6. Method of transmitting data according to claim 4, in which, before step b), the transfer of the second packet at the output from the first node has already begun, and at least a second data group in the second packet has already been transferred at the output from the first node and/or has already exited from the first node, while no data from the first data packet has yet been transferred to the output of the first node and/or has already been output from the first node, the method, also comprising the following step after step b) and before step d), and possibly during a partial stop of the second data packet transfer:

stop said other data group of the second packet,
displace or transfer said second data group of the second packet, into the network.

7. Method of transmitting data according to claim 4, in which, before step b), at least a third data group of the second packet has not yet accessed the first node, also including the following step, after step b) and before step d), and possibly during a partial stop of the second data packet:

transfer of at least part of the data in the third group of data in the second packet, to the input of the first node.

8. Method of transmitting data according to claim 5, in which, after step b) and before step d), at least a third data packet associated with a channel with a higher priority level than the second channel accesses the first node and is getting ready to access said output from the first node, the method also including:

transfer of the entire said third packet at the output from the first node, before step d).

9. Method of transmitting data according to claim 8, in which the third packet is associated with a channel with priority level equal to the priority level of the first channel, said transfer of the entire said third packet at the output from the first node is made after step c) and before step d).

10. Method of transmitting data according to claim 8, in which the third packet is associated with a channel with a priority level higher than the priority level of the first channel, said transfer of the entire said third packet at the output from the first node is made prior to step c).

11. Method of transmitting data according to claim 2, in which in step a) the first element is a first node and in which the first data packet and the second data packet are associated with the same priority channel, the arbitration of the transfer order is also determined as a function of the order of arrival at the first node, the first packet and the second packet or/and as a function of the input of the first node through which the first packet and the second packet accessed this first node.

12. Method of transmitting data according to claim 11, in which before step b), a first group of data in the first data packet and another group of data in the second packet have already accessed the first node and are getting ready to access an output or the same output of the first node, and in which in step b), a second data group in the second data packet has already been transferred to the output of the first node or has already been exited from the first node, also including after step b):
e) transfer of the second data packet at the output from the first node,
f) transfer of the first data packet at the output from the first node after the entire second packet has been transferred at the output from the first node.

13. Method of transmitting data according to claim 11, in which at least one third data packet associated with a channel with a priority level higher than the channel with which the first packet and the second packet are associated, accesses the first node after step b) and before step e), and is getting ready to access said output of the first node, the method also comprising:

transfer of the entire said third packet at the output from the first node, before step e).

14. Method of transmitting data according to claim 13, in which the third data packet accesses the first node before step a) or during step c), also including:

transfer of the entire said third packet to the output of the first node, before step f).

15. Method of transmitting data according to claim 2, in which the first packet and the second packet are intended to follow a first path in the network and a second path in the network respectively, the method also comprising before step b):

determination of the first and second paths.

16. Method of transmitting data according to claim 15, also comprising the following step before step b):

a network resource assigns data for the first path to the first packet, and another network resource assigns data for the second path to the second packet.

17. Method of transmitting data according to claim 2, the first data packet being associated with a priority channel, and the second data packet being associated with a priority channel, as a function of the type of data included in said first and second packets.

18. Method of transferring data in a network on chip according to claim 1, at least one element in the network being controlled by a first clock.

19. Method of transferring data in a network on chip according to claim 18, one or several other elements in the network being controlled by a second clock, different from the first clock or that is not synchronous with the first clock.

20. Method of transferring data in a network on chip according to claim 1, one or several elements not being controlled by a clock or not being provided with a clock.

21. Network on chip device comprising a plurality of elements capable of communicating with each other, including a plurality of resources capable of processing data, and one or several nodes provided with one or several inputs and one or several outputs, capable of switching data to at least two elements in the network comprising:

means for sending data, capable of sending data in the form of packets associated with priority level or priority channel information and comprising one or several elementary data groups, means for receiving data, capable of receiving data in the form of packets comprising one or several elementary data groups, means for sending synchronization signals according to an asynchronous send/accept synchronization protocol, capable of sending at least one send type signal accompanying or associated with sending an elementary data group, said send type signal according to said asynchronous send/accept synchronization protocol at least partly comprising said priority level or priority channel information: said send/accept synchronization protocol being configured to govern data transfer so that a given elementary group of data in a data packet may be sent by a sending element while another elementary group of data preceding said given elementary group of data in said packet has been accepted by the receiving element, means for reception of synchronization signals according to said asynchronous send/accept synchronization protocol, capable of receiving at least one accept type signal, before reception of an elementary data group, also comprising:

means for authorizing sending an elementary data group of a packet following reception of an accept type synchronization signal, and of authorizing reception of an elementary data group of a packet following reception of a send type synchronization signal, said send type signal accompanying or associated with the sending of an elementary group of data in a packet at least partially comprising the priority level or priority channel information with which said packet is associated.

22. Network on chip device according to claim 21, also including:

at least a first resource comprising priority association means capable of associating at least one priority channel chosen from among a predetermined set of priority channels with at least one data packet that this resource will send, at least one first element also comprising: arbitration means, capable of determining a transfer order at the output from the first node between at least one first packet associated with a priority channel and at least a second data packet associated with a priority channel, the transfer order being determined at least as a function of a corresponding priority channel or priority channels with which the first and the second packets were associated by a corresponding resource in the network.

23. Network on chip device according to claim 22, in which said first element is a first node in which the first packet and the second packet are associated with a first priority and a second priority channel different from the first channel, the arbitration means also being capable of determining the order of transfer between the first packet and the second packet solely as a function of the corresponding channels with which the first packet and the second packet are associated.

24. Network on chip device according to claim 22, in which the first element is a first node, the first packet and the second packet are associated with the same priority channel, the arbitration means also being capable of determining the order of transfer between the first packet and the second packet as a function of the order of arrival of the first and the second packets at the input to the first node.

25. Network on chip device according to claim 24, the arbitration means also being able to determine the order of transfer between the first packet and the second packet as a function of the input to the first node through which the first and the second packet arrived at the first node.

26. Network on chip device according to claim 22, the first resource also comprising:
  means for assigning path data capable of assigning to at least one data packet that first resource is likely to send, data related to the path that this packet will follow in the network, to at least one data packet that the first resource will send.

27. Network on chip device according to claim 26, in which the first element is a first node and in which the first data packet and the second data packet have each been associated with first path data and second path data, by a corresponding network resource, the first node also comprising:
  data routing means, capable of routing said first packet and said second packet, at least partially or totally depending on the path data with which the first packet and the second packet were associated by a network resource.

28. Network on chip device according to claim 27, the first node also comprising means for memorizing path data.

29. Network on chip device according to claim 22, the means for associating the priority being capable of associating at least one priority channel chosen from among a predetermined set of priority channels as a function of the data type contained in this packet, with at least one data packet that this first resource will send.

30. Network on chip device according to claim 21, in which at least one of said elements in the network is controlled by a first clock.

31. Network on chip device according to claim 30, at least one other element among said elements being controlled by a second clock, different from the first clock or not synchronous with the first clock.

32. Network on chip device according to claim 21, at least one of said elements in the network not being controlled by a clock or not being provided with a clock.

* * * * *